United States Patent [19]

Miller

[11] Patent Number: 5,473,467
[45] Date of Patent: Dec. 5, 1995

[54] LINEAR OPTICAL AMPLIFIER

[75] Inventor: David A. B. Miller, Fair Haven, N.J.

[73] Assignee: AT&T Corp., Murray Hill, N.J.

[21] Appl. No.: 273,042

[22] Filed: Jul. 8, 1994

[51] Int. Cl.[6] .............................. H01S 3/102; G02F 1/015
[52] U.S. Cl. .......................................... 359/333; 359/244
[58] Field of Search .................................... 359/244, 245, 359/276, 344, 333

[56] References Cited

U.S. PATENT DOCUMENTS

| | | | |
|---|---|---|---|
| 4,812,776 | 3/1989 | Sasaki | 357/17 |
| 4,826,295 | 5/1989 | Burt | 350/355 |
| 4,896,121 | 1/1989 | Larson | 330/288 |
| 5,047,822 | 9/1991 | Little, Jr. et al. | 357/30 |
| 5,134,358 | 7/1992 | Agiman | 323/316 |
| 5,166,553 | 11/1992 | Kotera et al. | 307/448 |

OTHER PUBLICATIONS

*Physics of Semiconductor Devices*, S. M. Sze, Wiley, N.Y., 2nd ed. 1981, p. 322.
"The Quantum Well Self–Electrooptic Effect Device: Optoelectronic Bistability and Oscillation, and Self–Linearized Modulation", *IEEE Journal of Quantum Electronics*, D. A. B. Miller, vol. QE–21, No. 9 Sep. 1985, pp. 1462–1476.
*IEEE Journal of Quantum Electronics*, L. A. D'Asaro et al., vol. 29 No. 2, Feb. 1993, pp. 678–698.
"Novel Analog Self–Electrooptic–Effect Devices", *IEEE Journal of Quantum Electronics*, D. A. B. Miller, vol. 29, No. 2, Feb. 1993, pp. 678–698.
Co–pending U.S. patent application Ser. No. 08/272,161 filed Jul. 7, 1994, "Current Mirror In Depletion–Mode Field Effect Transmission With Level Shifting," (D A. B. Miller Case 49).
Co–pending U.S. patent application Ser. No. 08/272,083, filed Jul. 8, 1994, "Apparatus for Converting Optical Bipolar Signals To Optical Unipolar Signals", (D. A. B. Miller Case 50).

*Primary Examiner*—Mark Hellner
*Attorney, Agent, or Firm*—Stuart H. Mayer

[57] ABSTRACT

An optical amplifier includes a photodetector such as a photodiode for receiving an optical input signal to be amplified. An electro-absorption modulator is responsive to a photocurrent generated by the photodetector such that the modulator absorbs a portion of an optical beam transmitted therethrough in an amount proportional to an amplified replica of the photocurrent. The remaining portion of the beam transmitted through the modulator forms a signal that is an inverted, amplified replica of the input signal.

18 Claims, 2 Drawing Sheets

LINEAR OPTICAL AMPLIFIER

TECHNICAL FIELD

The invention relates generally to optical amplifiers, and more particularly to optical amplifiers that provide linear amplification.

BACKGROUND OF THE INVENTION

There are numerous difficulties involved with known arrangements for linearly amplifying optical signals. These problems are particularly difficult to overcome when many different optical signals must be amplified by the same gain factor, such as occurs when an array of optical beams are to be amplified or an image having many distinct picture elements is to be amplified. This problem arises because it is difficult to fabricate many separate amplifying elements that all have substantially the same gain factor.

SUMMARY OF THE INVENTION

In accordance with this invention an optical amplifier includes a photodetector such as a photodiode for receiving an optical input signal to be amplified. An electro-absorption modulator is responsive to a photocurrent generated by the photodetector such that the modulator absorbs a portion of an optical beam transmitted therethrough in an amount proportional to an amplified replica of the photocurrent. The remaining portion of the beam transmitted through the modulator forms a signal that is an inverted, amplified replica of the input signal. In one particular embodiment of the invention, the photocurrent is amplified by a current amplifier such as an amplifying current mirror that is electrically coupled to the photodetector. As a result of this arrangement, the invention provides an optical amplifier that can both linearly amplify an optical signal and provide a gain factor that is substantially identical from amplifier to amplifier.

In an alternative embodiment of the invention, the electro-absorption modulator is a self-linearized modulator for generating one electron of photocurrent for each photon it absorbs. Moreover, the photodiode may be of a type that generates one electron of photocurrent for each photon incident thereon.

DETAILED DESCRIPTION

Figure 1:
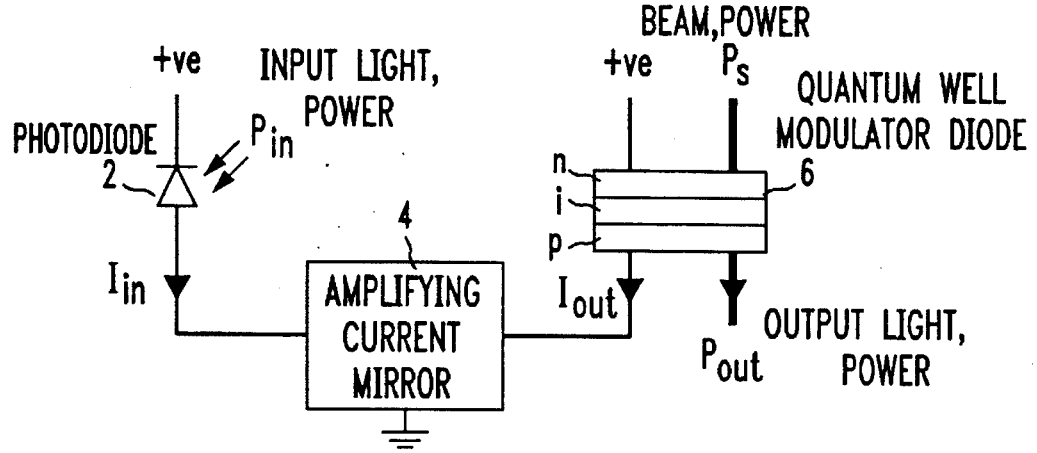
FIG. 1 shows one embodiment of an optical amplifier in accordance with this invention.

FIG. 1 illustrates one embodiment of the optical amplifier 20 of the present invention. The amplifier 20 includes a photodetector 2 coupled to a current amplifier 4 such as an amplifying current mirror, for example. The exemplary photodetector 2 shown in FIG. 1 is a reversed-biased photodiode. The current amplifier 4 is in turn coupled to an electro-absorption modulator 6. The electro-absorption modulator 6 absorbs optical energy from an optical beam incident thereon in an amount proportional to the current passing through it.

In operation, the optical signal to be amplified is incident upon the photodiode 2. As is well-known, the photocurrent generated by a typical reverse-biased photodiode is linearly proportional to the power of the incident optical signal. For many photodiodes the proportionality between the photocurrent and input power is such that for every incident photon one electron of current is generated, i.e., $$I_{PC} = \frac{e}{\omega} P_{in} \qquad (1)$$

where $I_{pc}$ is the current generated by the photodiode, $\hbar\omega$ is the incident photon energy and e is the electronic charge. For the sake of clarity the following discussion will assume that the optical amplifier of the present invention employs photodiodes possessing this characteristic. However, one of ordinary skill in the art will recognize that the present invention may employ instead photodiodes having a different relationship between the incident power and the generated current.

The photocurrent generated by the photodiode 2 serves as the input current to the current amplifier 4. One type of current amplifier that will be discussed in more detail below is a current mirror. Current mirrors of unity gain are well-known and serve to reproduce a current from one location to one or more other locations. These known current mirrors can be modified in a manner described below to form a current mirror that provides an amplified replica of the input current. In the present invention, the current mirror 4 produces an output current $I_{out}$ in response to the input current $I_{in}$ generated by the photodiode 2. The output current $I_{out}$ is equal to the input current $I_{in}$ multiplied by a gain factor g, i.e., $$I_{out} = gI_{in} \qquad (2)$$

The output current $I_{out}$ produced by the current mirror 4 is directed to the electro-absorption modulator 6. As noted above, the electro-absorption modulator 6 absorbs optical energy from an incident optical beam in an amount proportional to the current passing through it. It is well-known that certain electro-absorption modulators absorb one photon for every electron of current passing through it. This mode of operation is known as the "self-linearized modulator" mode and a modulator operating in this mode is referred to as a self-linearized modulator. An example of a self-linearized modulator that may be employed in the present invention is disclosed in the reference by D. A. B. Miller et al., IEEE Journal of Quantum Electronics, Vol. QE-21, Number 9, September 1985, pages 1462–1476. While the electro-absorption modulator shown in FIG. 1 transmits light therethrough, other modulators may be employed in which the modulator contains a reflective surface for reflecting light back through the modulator. Moreover, other electro-absorption modulators having a self-linearized mode of operation may be employed such as, for example, a bulk semiconductor diode that utilizes the Franz-Keldysh effect. Additionally, while the present invention will be described below as employing a self-linearized modulator, one of ordinary skill in the art will recognize that any electro-absorption modulator may be used for which the optical energy absorbed is proportional to the current passing through the modulator.

As seen in FIG. 1, a supply beam $P_S$ of substantially constant power is incident upon the electro-absorption modulator 6. The modulator 6 absorbs a portion of the supply beam $P_S$ in response to the current $I_{out}$ passing through the modulator 6. The remainder of the supply beam $P_S$ is transmitted through the modulator to form an optical output beam $P_{out}$. If the modulator 6 operates in the self-linearized mode, output beam $P_{out}$ is smaller than the supply beam $P_S$ by an amount corresponding to one photon for every electron of current passing through the modulator, i.e., $$P_{out} = P_S - \frac{\omega}{e} I_{out} \qquad (3)$$

Hence, for the particular case of a photodiode 2 that generates one electron of current for each incident photon, $$P_{out} = P_s - gP_{in} \qquad (4)$$

As equation (4) indicates, the optical output power of the optical amplifier 20 decreases in inverse proportion to the optical input power multiplied by the gain factor g. Accordingly, the optical amplifier 20 of the present invention serves as a linear inverting amplifier.

Figure 2:
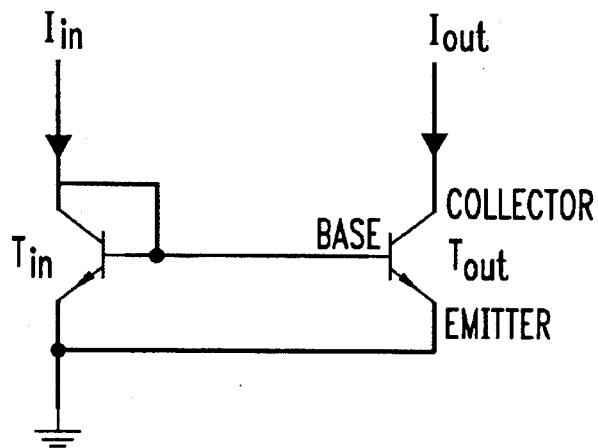
FIGS. 2–3 show examples of known current mirror circuits.
Figure 3:
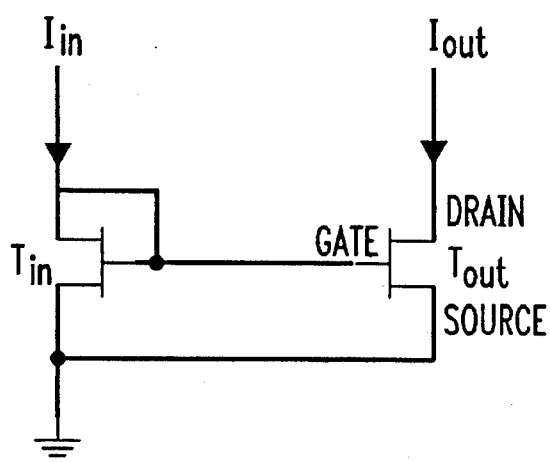

As noted above, the present invention employs a current amplifier. One type of current amplifier that may be used is an amplifying current mirror. FIGS. 2–3 show examples of unity-gain current mirrors that employ bipolar transistors and enhancement-mode FETS, respectively. Examples of various current mirrors are disclosed in U.S. Pat. Nos. 5,134,358, 5,166,553, and 4,896,121. Another current mirror that may be employed in the present invention is disclosed in the co-pending application entitled "Current Mirror in Depletion-Mode Field Effect Transistors With Level Shifting," by D. A. B. Miller, filed in the U.S. Patent and Trademark Office on Jul. 7, 1994, which is hereby incorporated by reference. Regardless of the type of transistor employed, each current mirror shown in FIGS. 2–3 has an input transistor $T_{in}$ and an output transistor $T_{out}$ whose gates (or bases in the case of the bipolar transistors shown in FIG. 2) are coupled together. The sources (or emitters) of the input and output transistors $T_{in}$ and $T_{out}$ are also coupled together and in the exemplary current mirrors shown in the figures the sources (or emitters) are connected to ground. The drain (or collector) of the input transistor $T_{in}$ is coupled to the gate (or base) of both the input and output transistors $T_{in}$ and $T_{out}$. In operation, a current $I_{in}$ supplied to the drain (or collector) of the input transistor will be reproduced at the drain (or collector) of the output transistor $T_{out}$.

Figure 4:
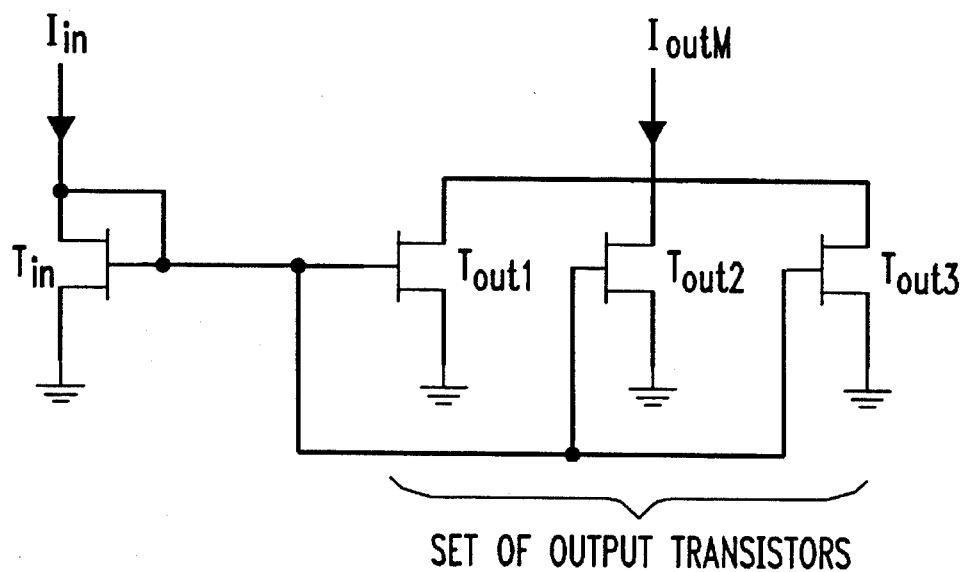
FIG. 4 shows an amplifying current mirror that may be employed in the optical amplifier of the present invention.

Assuming the input and output transistors are identical, the current mirrors shown in FIGS. 2–3 all provide unity gain. These circuits may be modified in any appropriate manner to provide an amplifying current mirror that may be employed in the present invention. For example, a simple modification involves adding in parallel one or more additional output transistors to the single output transistor shown in FIGS. 2–3. FIG. 4 shows an example of such an amplifying current mirror which employs enhancement-mode field effect transistors and three output transistors $T_{out1}$, $T_{out2}$, and $T_{out3}$. The three output transistors each have the same gate-source voltage, and hence, over a given operating range, each transistor has the same drain current. Consequently, the total output current $I_{outM}$ for the circuit of FIG. 4 will be substantially equal to three times the input current $I_{in}$, assuming the input transistor $T_{in}$, and each of the output transistors $T_{out1}$, $T_{out2}$, and $T_{out3}$, are substantially identical.

In general, the gain of an amplifying current mirror that employs a plurality of output transistors connected in parallel is equal to the number of output transistors, again assuming that all of the input and output transistors are substantially identical. Accordingly, the gain is not dependent on the precise details of the characteristics of any of the transistors. This feature of the amplifying current mirror shown in FIG. 4 is particularly advantageous since it is relatively easy to fabricate many transistors that are substantially identical even though their precise characteristics (e.g., the threshold voltage of field effect transistors or the current gain in bipolar transistors) cannot be readily controlled. As a result, a current mirror of the type shown in FIG. 4 can be fabricated with a predetermined gain that is precisely controlled. Moreover, the gain is independent of external parameters that may affect the characteristics of the transistors, such as temperature, for example. Accordingly, this amplifying current mirror may be advantageously employed in an array of optical amplifiers in which the individual amplifying elements are all designed to have substantially identical gain.

Figure 5:
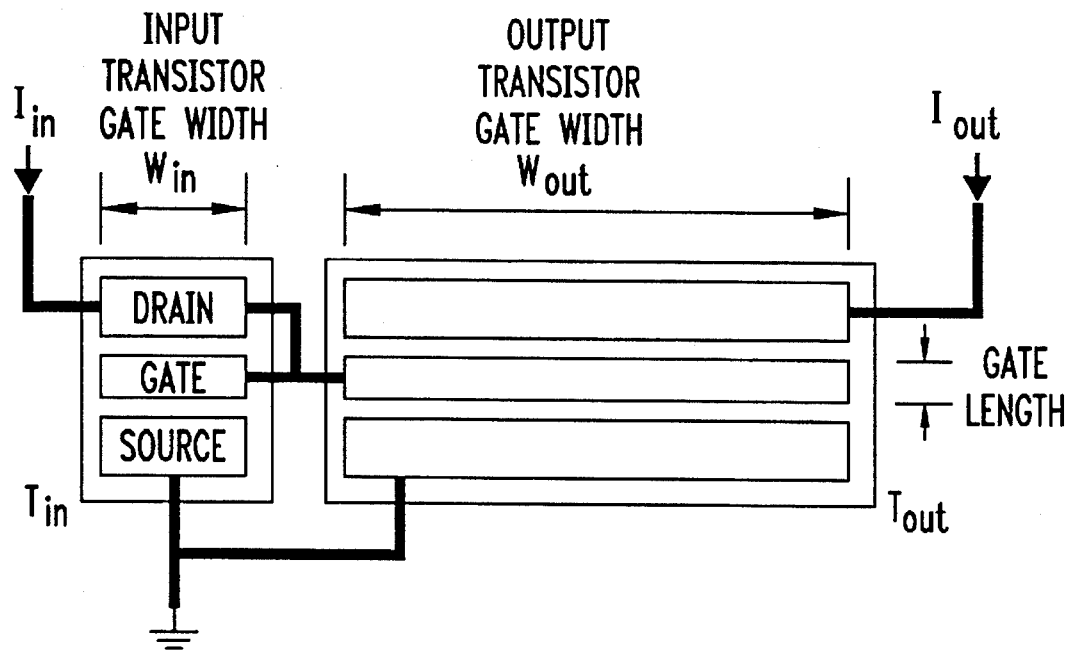
FIG. 5 shows an amplifying current mirror employing enhancement-mode FETs in which the size of the input FET differs from the size of the output FET.

An alternative to the amplifying current mirror shown in FIG. 4 uses only a single output transistor such as shown in FIGS. 2–3. However, in this case the output transistor is larger than the input transistor. For example, as the area of a bipolar transistor increases (e.g., the emitter-base and collector-base areas) the current increases for a given emitter-base voltage, at least over a certain operating range. Typically, as the size of the bipolar transistor is increased, the other design parameters such as the doping levels and the thickness of the emitter, base, collector, and other appropriate layers are unchanged from their initial values. Similarly, for field-effect transistors, as the width of the transistor increases, the drain current increases for a given gate voltage, at least over a certain operating range and assuming that the doping levels, gate length, and the spacings between the drain, gate and source are all maintained at constant values. If such an amplifying current mirror is formed from the circuit shown in FIG. 2, the gain is determined by the ratio of the area of the output transistor to the area of the input transistor. If an amplifying current mirror is formed from the circuit shown in FIG. 3, the gain is determined by the ratio of the width $W_{out}$, of the output field effect transistor $T_{out}$ to the width $W_{in}$ of the input field effect transistor $T_{in}$. An example of such a circuit employing enhancement-mode field effect transistors is shown in FIG. 5 as it might be laid out for lithographic fabrication by techniques well known to those skilled in the art. In this case, the gain of the amplifying current mirror circuit is approximately $W_{out}/W_{in}$.

The optical amplifier of the present invention may be fabricated from discrete components or as a single component monolithically integrated on a semiconductor wafer. Monolithic integration employing enhancement-mode FETs may be achieved by using conventional GaAs fabrication technology such as described in S. M. Sze, *Physics of Semiconductor Devices*, Wiley, New York, 2nd ed. 1981, p. 322. Monolithic integration employing depletion-mode FETs, quantum well modulators, and photodetectors may be achieved, for example, by a method disclosed in L. A. D'Asaro et al., *IEEE Journal of Quantum Electronics*, Vol. 29, Number 2, February 1993, pages 670–677.

I claim:

1. An inverting optical amplifier comprising:

a photodetector for receiving an optical input signal;

a current amplifier electrically coupled to said photodetector for receiving a photocurrent generated by said photodetector; and an electro-absorption modulator electrically coupled to said current amplifier for receiving a current from said current amplifier.

2. The amplifier of claim 1 wherein said photodetector is a photodiode.

3. The amplifier of claim 1 wherein said current amplifier is an amplifying current mirror.

4. The amplifier of claim 1 wherein said electro-absorption modulator is a self-linearized modulator.

5. The amplifier of claim 2 wherein said electro-absorption modulator is a self-linearized modulator and said photodiode is configured to generate one electron of photocurrent for every photon of optical energy incident thereon.

6. An inverting optical amplifier comprising:

a photodetector for receiving an optical input signal;

means, responsive to said photodetector, for amplifying a photocurrent generated by said photodetector; and means for absorbing a portion of an optical beam in an amount proportional to a current received from said amplifying means.

7. The amplifier of claim 6 wherein said absorbing means comprises an electro-absorption modulator electrically coupled to said amplifying means.

8. The amplifier of claim 6 wherein said photodetector is a photodiode.

9. The amplifier of claim 6 wherein said amplifying means is an amplifying current mirror.

10. The amplifier of claim 7 wherein said electro-absorption modulator is a self-linearized modulator.

11. The amplifier of claim 8 wherein said electro-absorption modulator is a self-linearized modulator and said photodiode is configured to generate one electron of photocurrent for every photon of optical energy incident thereon.

12. An inverting optical amplifier comprising:

a photodetector for receiving an optical input signal; and an electro-absorption modulator responsive to a photocurrent generated by the photodetector such that said modulator absorbs a portion of an optical beam transmitted therethrough in an amount proportional to an amplified replica of the photocurrent.

13. The amplifier of claim 12 further comprising a current amplifier for providing the amplified replica of the photocurrent generated by the photodetector.

14. The amplifier of claim 12 wherein said photodetector is a photodiode.

15. The amplifier of claim 13 wherein said current amplifier is an amplifying current mirror.

16. The amplifier of claim 12 wherein said electro-absorption modulator is a self-linearized modulator.

17. The amplifier of claim 14 wherein said electro-absorption modulator is a self-linearized modulator and said photodiode is configured to generate one electron of photocurrent for every photon of optical energy incident thereon.

18. An apparatus comprising:

a photodetector for receiving an optical input signal;

a current source electrically coupled to said photodetector for providing gain to a photocurrent generated by said photodetector; and an electro-absorption modulator electrically coupled to said current source for receiving a current from said current source.

\* \* \* \* \*